US008224796B1

(12) United States Patent
Shinde et al.

(10) Patent No.: US 8,224,796 B1
(45) Date of Patent: Jul. 17, 2012

(54) SYSTEMS AND METHODS FOR PREVENTING DATA LOSS ON EXTERNAL DEVICES

(75) Inventors: Amit Shinde, Maharashtra (IN); Jeff Graham, Olney, MD (US); Rajesh Upadhyay, Newark, CA (US)

(73) Assignee: Symantec Corporation, Mountain View, CA (US)

( * ) Notice: Subject to any disclaimer, the term of this patent is extended or adjusted under 35 U.S.C. 154(b) by 377 days.

(21) Appl. No.: 12/558,333

(22) Filed: Sep. 11, 2009

(51) Int. Cl.
*G06F 7/00* (2006.01)
*G06F 17/00* (2006.01)

(52) U.S. Cl. .......... 707/695; 707/782; 707/821; 726/22; 726/26

(58) Field of Classification Search .................. 707/647, 707/782, 783, 821, 695; 726/1, 22, 26
See application file for complete search history.

(56) References Cited

U.S. PATENT DOCUMENTS

| 6,986,033 B2 * | 1/2006 | Miyamoto et al. ................. 713/1 |
| 7,058,850 B2 * | 6/2006 | Cochran ............... 714/E11.105 |
| 7,991,747 B1 * | 8/2011 | Upadhyay et al. ............ 707/674 |
| 2002/0133738 A1 * | 9/2002 | Zeigler et al. ..................... 714/6 |
| 2005/0025161 A1 * | 2/2005 | Spooner ........................ 370/401 |
| 2007/0130232 A1 * | 6/2007 | Therrien et al. ............. 707/204 |
| 2009/0158430 A1 * | 6/2009 | Borders .......................... 726/23 |
| 2009/0199250 A1 * | 8/2009 | Assouline et al. ............ 709/230 |
| 2009/0232300 A1 * | 9/2009 | Zucker et al. ..................... 380/2 |
| 2009/0292743 A1 * | 11/2009 | Bigus et al. ..................... 707/202 |
| 2010/0115614 A1 * | 5/2010 | Barile et al. ..................... 726/22 |
| 2010/0162347 A1 * | 6/2010 | Barile ................................ 726/1 |
| 2010/0212012 A1 * | 8/2010 | Touboul et al. ................. 726/23 |

OTHER PUBLICATIONS

Jason Croft and Robert Signorile—"A Self-Destructing File Distribution System With Feedback for Peer-to-Peer Networks"—Department of Computer Science—Boston College—Mar. 2009, (pp. 1-6).*
A. L. Lister, A. R. Jones, M. Pocock, O. Shaw, A. Wipat.—"Implementing the FuGE Object Model: a Systems Biology Data Portal and Integrator"—University of Newcastle upon Tyne, Science Computing—No. CS-TR-1016 Apr. 2007 (pp. 1-13).*
Sumesh Jaiswal; Systems and Methods for Generating Machine Learning-Based Classifiers for Detecting Specific Categories of Sensitive Information: U.S. Appl. No. 13/191,018, filed Jul. 26, 2011.
Phillip DiCorpo et al.; User Interface and Workflow for Performing Machine Learning; U.S. Appl. No. 13/038,299, filed Mar. 1, 2011.

* cited by examiner

*Primary Examiner* — Anh Ly
(74) *Attorney, Agent, or Firm* — Advantedge Law Group

(57) ABSTRACT

A computer-implemented method for data loss prevention may include: 1) indentifying an external device, 2) intercepting a write attempt to a file on the external device, 3) creating a sandbox version of the file, 4) performing the write attempt on the sandbox version of the file, and then 5) analyzing the sandbox version of the file for potential data-loss violations. Various other methods, systems, and computer-readable media are also disclosed.

16 Claims, 7 Drawing Sheets

SYSTEMS AND METHODS FOR PREVENTING DATA LOSS ON EXTERNAL DEVICES

BACKGROUND

In the electronic information age, people may share, access, and disseminate high volumes of information. In addition, the workforce has become increasingly mobile, and the ubiquity of high-speed Internet access, smart mobile devices, and portable storage means that "the office" may be anywhere. As a consequence, it has become more difficult than ever for organizations to prevent the loss of sensitive data. Organizations are therefore increasingly looking to Data Loss Prevention ("DLP") solutions to protect their sensitive data.

A typical DLP system may attempt to prevent sensitive data from being stored on external devices (e.g., network shares or removable media). For example, in one approach, a traditional DLP system may detect when files on external devices are closed. Once a file is closed, the traditional DLP system may scan the file for sensitive data and delete the file from the external device if necessary.

Unfortunately, deleting sensitive data from external devices may not always work or fully prevent data leakage. For example, the DLP system may lose access to an external device after a sensitive file is written to the device but before the DLP system can fully scan the file (e.g., a user may remove a USB flash drive from a computer directly after writing a sensitive file to the flash drive before the DLP system has fully scanned the sensitive file). In addition, a sensitive file may be written to a write-once medium (e.g., a CD-R or DVD-R), which may effectively prevent a DLP system from deleting the sensitive file. Moreover, even if a DLP system is able to successfully delete a sensitive file from an external device, a disk analysis tool might be able to later recover the deleted data.

SUMMARY

As will be described in greater detail below, the instant disclosure generally relates to systems and methods for preventing data loss on external devices. Embodiments of the instant disclosure may improve the effectiveness of data loss prevention on external devices by scanning files before writing the files to external devices. In one example, the various systems disclosed herein may accomplish this task by: 1) identifying an external device (such as a network share, USB storage device, and/or CD or DVD drive), 2) intercepting a write attempt to a file on the external device, 3) creating a sandbox version of the file, 4) performing the write attempt on the sandbox version of the file, and then 5) analyzing the sandbox version of the file for potential data-loss violations.

In some embodiments, creating the sandbox version of the file may include creating a sandbox version of the file on a local device. Additionally or alternatively, creating the sandbox version of the file may include: 1) intercepting an attempt to open the file, 2) determining that the file is not open, and then 3) copying the contents of the file to the sandbox version of the file. In addition, the various systems disclosed herein may create a sandbox version of the file in a variety of ways, including, for example, by creating the sandbox version of the file on a hidden virtual disk and/or creating the sandbox version of the file with restricted access privileges.

In some examples, performing the write attempt on the sandbox version of the file may include marking the sandbox version of the file as modified. In addition, analyzing the sandbox version of the file for potential data-loss violations may include intercepting an attempt to close the file and analyzing the sandbox version of the file for potential data-loss violations before closing the file. Additionally or alternatively, performing the write attempt on the sandbox version of the file may include determining that the sandbox version of the file was modified.

According to some embodiments, the method may further include redirecting an attempt to read from the file to the sandbox version of the file. In certain embodiments, the method may additionally include determining, based on the analysis of the sandbox version of the file, that a data-loss violation has not occurred. In some examples, the method may also include detecting, based on the analysis of the sandbox version of the file, a data-loss violation and then deleting the sandbox version of the file.

As will be explained below, by intercepting attempts to write to a file on an external device and redirecting those attempts to a sandbox version of the file, the systems and methods described herein may ensure that writes to the file comply with data loss protection policies before actually writing data to the external device (which may, as detailed above, potentially lead to irreversibly leaking sensitive data). In addition, and as will be discussed below, some embodiments described herein may intercept all attempts to access a file on an external device (e.g., opening, reading, writing, and/or closing the file) as part of effectively sandboxing the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
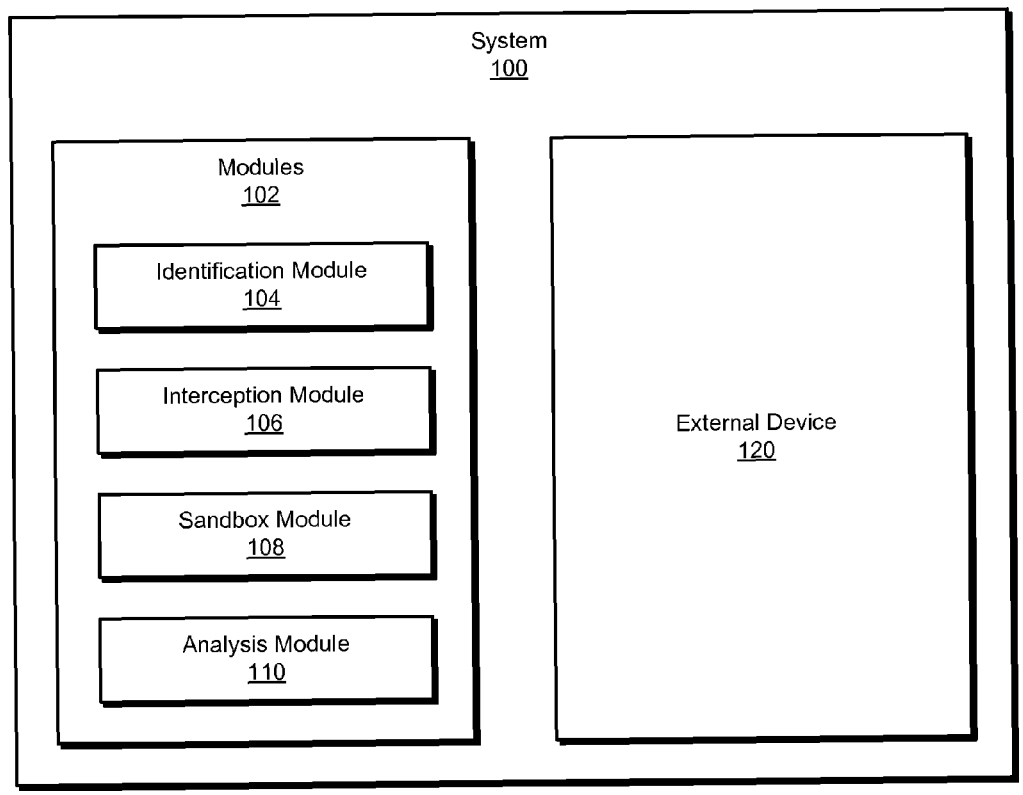
FIG. 1 is a block diagram of an exemplary system for preventing data loss on external devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for preventing data loss on external devices. In one example, the various systems disclosed herein may accomplish this task by: 1) identifying an external device, 2) intercepting a write attempt to a file on the external device, 3) creating a sandbox version of the file, 4) performing the write attempt on the sandbox version of the file, and then 5) analyzing the sandbox version of the file for potential data-loss violations.

As will be explained below, by intercepting attempts to write to a file on an external device and redirecting those attempts to a sandbox version of the file, the systems and methods described herein may ensure that writes to the file comply with data loss protection policies before actually writing data to the external device (which may, as detailed above, potentially lead to irreversibly leaking sensitive data). In addition, and as will be discussed below, some embodiments described herein may intercept all attempts to access a file on an external device (e.g., opening, reading, writing, and/or closing the file) as part of effectively sandboxing the file.

Figure 2:
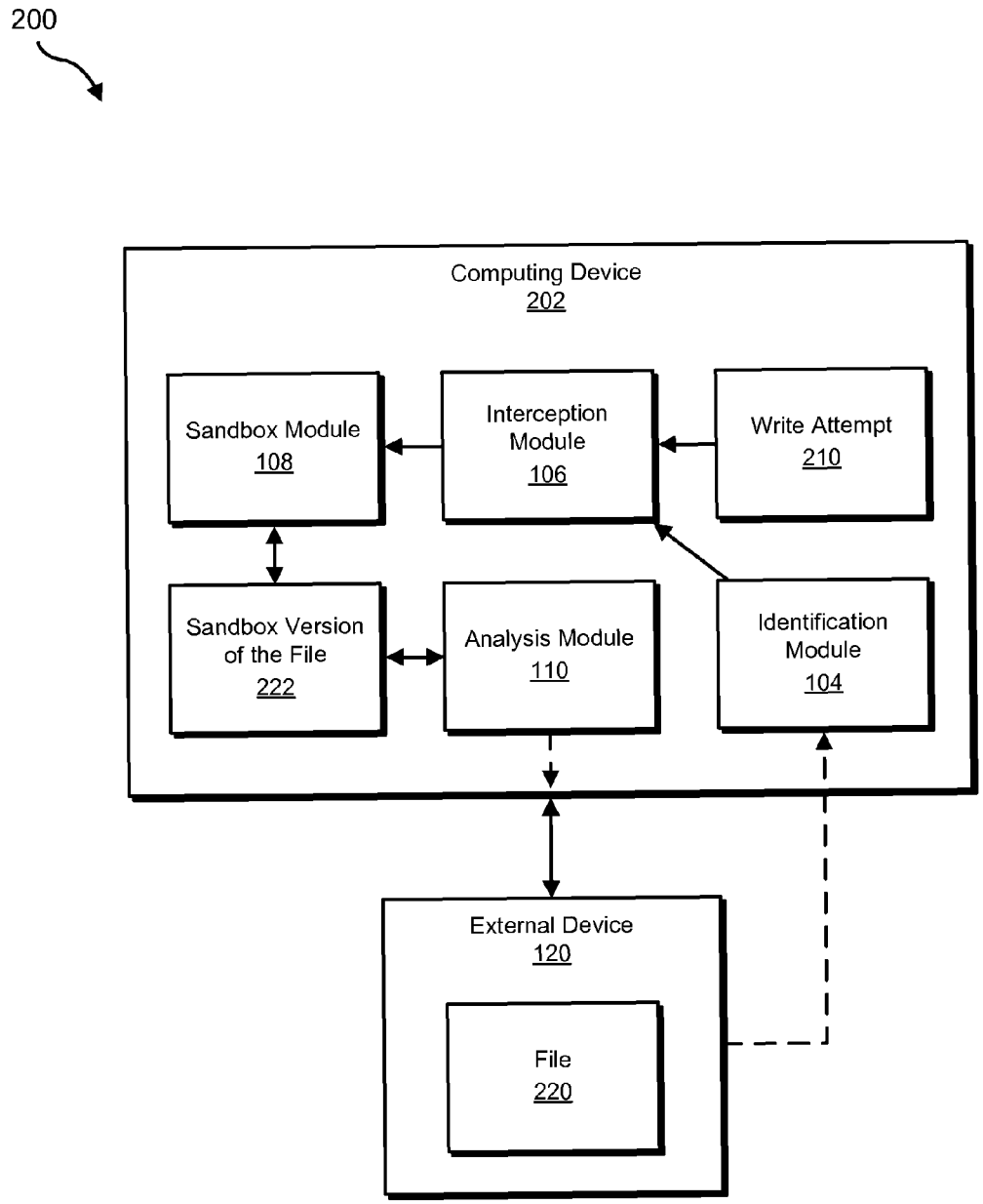
FIG. 2 is a block diagram of an exemplary system for preventing data loss on external devices.

The following will provide, with reference to FIGS. 1-2, detailed descriptions of exemplary systems for preventing data loss on external devices. Detailed descriptions of corresponding computer-implemented methods will also be provided in connection with FIGS. 3-5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for preventing data loss on external devices. As illustrated in this figure, exemplary system 100 may include one or more modules 102 for performing one or more tasks. For example, as will be explained in greater detail below, exemplary system 100 may include an identification module 104 programmed to identify an external device (such as external device 120). Exemplary system 100 may also include an interception module 106 programmed to intercept a write attempt to a file on the external device.

In addition, and as will be described in greater detail below, exemplary system 100 may include a sandbox module 108 programmed to create a sandbox version of the file and perform the write attempt on the sandbox version of the file. Exemplary system 100 may also include an analysis module 110 programmed to analyze the sandbox version of the file for potential data-loss violations. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing device 202), system 400 in FIG. 4, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing device 202 in communication with an external device 120. In one embodiment, and as will be described in greater detail below, computing device 202 may be programmed to prevent data loss on external devices (such as external device 120).

For example, computing device 202 may be programmed with identification module 104, interception module 106, sandbox module 108, and analysis module 110 from FIG. 1. In this example, and as will be explained in greater detail below, identification module 104 may identify an external device (such as external device 120). Interception module 106 may then intercept a write attempt (such as write attempt 210 in FIG. 2) to a file on the external device (such as a file 220 on external device 120). Sandbox module 108 may then create a sandbox version of the file (such as a sandbox version 222 of the file in FIG. 2) and perform the write attempt on the sandbox version of the file. Analysis module 110 may then analyze the sandbox version of the file for potential data-loss violations.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 610 in FIG. 6, or any other suitable computing device.

External device 120 generally represents any type or form of computing device that is capable of storing a file. Examples of external device 120 include, without limitation, network shares, USB storage devices, compact disc drives and DVD drives. External device 120 may be connected to computing device 202 directly or across a network (or any other medium or architecture capable of facilitating communication or data transfer). Examples of such a network include, without limitation, an intranet, a wide area network (WAN), a local area network (LAN), a personal area network (PAN), the Internet, power line communications (PLC), a cellular network (e.g., a GSM Network), exemplary network architecture 700 in FIG. 7, or the like. Such a network may facilitate communication or data transfer using wireless or wired connections.

Figure 3:
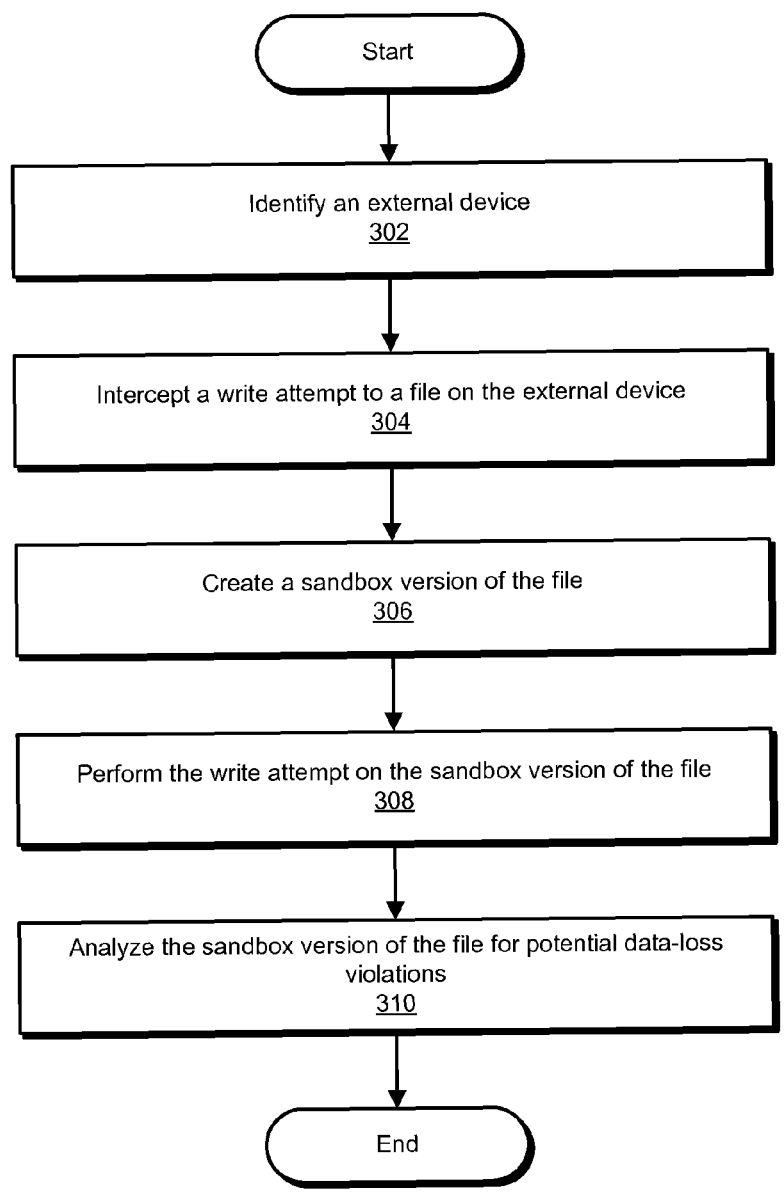
FIG. 3 is a flow diagram of an exemplary method for preventing data loss on external devices.

FIG. 3 is a flow diagram of an exemplary computer-implemented method 300 for preventing data loss on external devices. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify an external device. For example, identification module 104 in FIG. 2 may, as part of computing device 202, identify an external device 120.

Identification module 104 may perform step 302 in a variety of ways. In one example, identification module 104 may identify the external device by identifying an attempt to open a file on the external device. In another example, identification module 104 may identify the external device by querying the operating system. In some examples, identification module 104 may identify the external device by reading a configuration file.

As used herein, the phrase "external device" may refer to any device and/or system external to and/or removable from another computing device, system, and/or network. In particular, an external device may refer to any device that may expose an organization to data loss if sensitive data is written to the device before the data is scanned and/or analyzed. In addition, in some embodiments an external device may refer to any device external to a DLP-protected device, system, network, and/or organization. Examples of external devices include, without limitation, a network share, a USB storage device, a CD drive, and/or a DVD drive.

At step 304, the systems described herein may intercept a write attempt to a file on the external device identified in step 302. For example, interception module 106 in FIG. 2 may intercept a write attempt 210 to a file 220 on external device 120.

Interception module 106 may intercept write attempts in any suitable manner. For example, interception module 106 may include portions or all of a file system filter driver (such as a minifilter provided by MICROSOFT FILTER MANAGER) configured to intercept write attempts. Additionally or alternatively, interception module 106 may intercept the write attempt by inspecting the file system activity of a virtual machine from which the write attempt originated. In some embodiments, interception module 106 may intercept the write attempt by associating a reparse point with the file.

Interception module 106 may also intercept a variety of write attempts. For example, the write attempt may include an attempt to copy a file to the external device. Additionally or alternatively, the write attempt may include adding to and/or modifying an existing file on the external device.

At step 306, the systems described herein may create a sandbox version of the file identified in step 304. For example, sandbox module 108 in FIG. 2 may create a sandbox version 222 of file 220.

A "sandbox version" of a file may refer to a separate version of a file maintained for DLP purposes. Sandbox module 108 may create a sandbox version of a file in a variety of contexts. For example, sandbox module 108 may create a sandbox version of a file after interception module 106 intercepts an initial write attempt to the file. In another example, sandbox module 108 may create the sandbox version of the file after intercepting an attempt to open the file. In this example, sandbox module 108 may determine that the file is not open (but that the file does exist) and may copy the contents of the file to the sandbox version of the file.

Sandbox module 108 may create the sandbox version of the file in a variety of ways that may help to prevent data loss. For example, sandbox module 108 may create the sandbox version of the file on a local device (e.g., a device that is not external to DLP controls and/or protections). In another example, sandbox module 108 may create the sandbox version of the file on a hidden virtual disk (e.g., sandbox module 108 may use CALLBACK FILE SYSTEM to create the sandbox version of the file where it may be hidden from a user).

Additionally or alternatively, sandbox module 108 may create the sandbox version of the file with restricted access. For example, sandbox module 108 may set permissions to prevent a user from accessing the file. As another example, sandbox module 108 may use an access control list to give permission to read, write, and delete the sandbox version of the file only to a system account (such as the LocalSystem account on a MICROSOFT WINDOWS system), preventing any user from accessing the sandbox version of the file.

Returning to FIG. 3, the systems described herein may perform the intercepted write attempt on the sandbox version of the file. For example, sandbox module 108 may perform write attempt 210 intercepted in step 304 on the sandbox version 222 of file 220 in FIG. 2. In some cases, sandbox module 108 may, as part of performing the write attempt on the sandbox version of the file, mark the sandbox version of the file as modified. As will be described below, according to some embodiments the sandbox version of the file will only be analyzed if the sandbox version of the file was modified.

At step 310, the systems described herein may analyze the sandbox version of the file for potential data-loss violations. For example, after sandbox module 108 has performed the write attempt intercepted in step 304 on the sandbox version 222 of file 220 in FIG. 2, analysis module 110 may analyze the sandbox version 222 of file 220 for potential data-loss violations.

As used herein, the phrase "data-loss violation" may refer to a violation of any data-loss-prevention policy. Similarly, the phrase "data-loss-prevention policy" may refer to a policy, rule, method, and/or system that describes, defines, or otherwise identifies content that an organization desires to protect. A data-loss-prevention policy may be configured in a variety of formats. For example, a data-loss-prevention policy may include signatures, such as hashes, of sensitive data. Additionally or alternatively, a data-loss-prevention policy may include the sensitive data itself. In some embodiments, a data-loss-prevention policy may include one or more entries in a database or list. For example, each row of customer data in a customer data list may comprise a data-loss-prevention policy. As another example, each product-pricing entry in a product database may comprise a data-loss-prevention policy. Alternatively, a single data-loss-prevention rule may include a set of database entries or other data entries.

A data-loss-prevention policy may apply to the content of one or more files. As used herein, a "file" may refer to any form or type of data entity or digital information. For example, files may include data files, executable files, file segments or other portions of files, database entries, one or more segments of executable code, financial information, customer information, pricing information, product design information, trade-secret information, confidential information, privileged information and/or any other file or information.

In addition to identifying content of a file, a data-loss-prevention policy may also identify other attributes of the file. For example, a data-loss-prevention policy may identify a file name, a file creation date, a file modification date, a location where the file is stored, a size of the file, and/or any other attribute of the file. A data-loss-prevention policy may additionally or alternatively identify other contextual information associated with a file. For example, a data-loss-prevention policy may identify by whom a file is being accessed, a destination location of a file, and/or any other contextual information associated with a file.

Analysis module 110 may analyze the sandbox version of a file for potential data-loss violations in a variety of ways. For example, as will be described in greater detail below in connection with FIGS. 4 and 5, analysis module 110 may intercept an attempt to close the file and analyze the sandbox version of the file for potential data-loss violations before closing the file. In another example, analysis module 110 may determine that the sandbox version of the file was modified (e.g., analysis module 110 may determine that the sandbox version of the file has been written to beyond merely creating the sandbox version of the file and/or copying the original contents of the file from the external device). After completing step 310, the method of FIG. 3 may terminate.

In some examples, if analysis module 110 detects, based on the analysis of the sandbox version of the file, a data-loss violation, then analysis module 110 may delete the sandbox version of the file. In this manner, the write attempt to the file on the external device may ultimately fail. Analysis module 110 may also perform a security action in response to the data-loss violation. For example, analysis module 110 may notify a system administrator of the violation, send a copy of the sandbox version of the file to the system administrator before deleting the sandbox version of the file, and/or notify a user responsible for the write attempt that led to the data-loss violation.

Alternatively, if analysis module 110 determines, based on the analysis of the sandbox version of the file, that a data-loss violation has not occurred, then analysis module 110 may then copy the sandbox version of the file to the file on the external device. In this manner, the write attempt to the file on the external device may finally succeed.

In some embodiments, interception module 106 may also redirect an attempt to read from the file to the sandbox version of the file (e.g., through sandbox module 108). As will be described in greater detail below in connection with FIGS. 4 and 5, sandbox module 108 may read from the sandbox version of the file when read attempts are made on the file on the external device since, from the end-user perspective, the sandbox version of the file may contain the data intended for the file on the external device until the sandbox version of the file has been analyzed.

Interception module 106 may redirect the attempt to read from the file to the sandbox version of the file in any suitable manner. For example, interception module 106 may include portions or all of a file system filter driver (such as a minifilter provided by MICROSOFT FILTER MANAGER) configured to intercept and/or redirect ream attempts. Additionally or alternatively, interception module 106 may intercept the read attempt by inspecting the file system activity of a virtual machine from which the read attempt originated.

Figure 4:
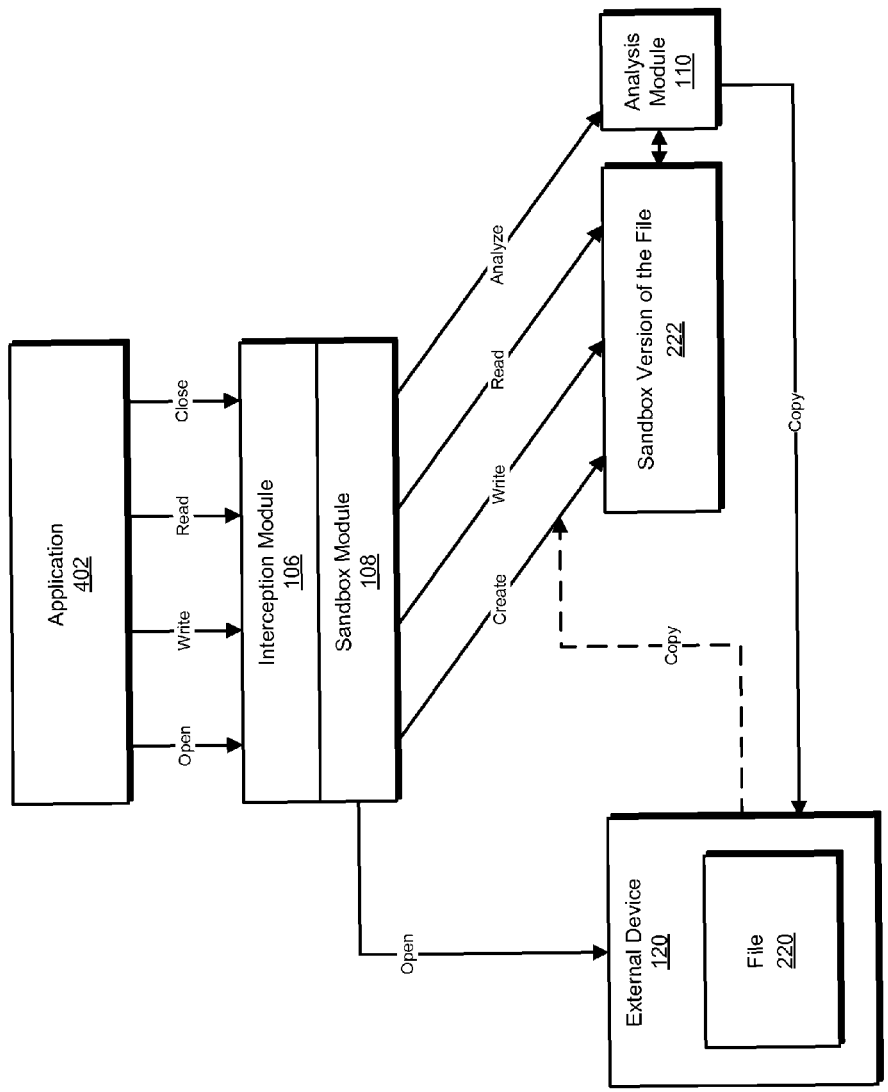
FIG. 4 is a block diagram of an exemplary system for preventing data loss on external devices.

The following will provide, with reference to exemplary system 400 in FIG. 4, exemplary descriptions of ways in which exemplary method 300 in FIG. 3 may be implemented. As shown in FIG. 4, system 400 may include an application 402. Application 402 may attempt to open, write to, read from, and/or close a file on an external device, such as file 220 on external device 120. Interception module 106 may intercept any such attempts and forward the same to sandbox module 108. Sandbox module 108 may then perform the various intercepted file operations on the sandbox version of the file 222.

For example, application 402 may attempt to open file 220. In this example, interception module 106 may intercept the open attempt and sandbox module 108 may create the sandbox version of the file 222. If file 220 already exists (e.g., application 402 attempted to open an existing file rather than a new file), sandbox module 108 may create the sandbox version of the file 222 by copying file 220.

Application 402 may subsequently attempt to write to file 220. Interception module 106 may then intercept the write attempt, and sandbox module 108 may perform the write attempt on the sandbox version of the file 222. At some point, application 402 may attempt to read from file 220. Interception module 106 may then intercept the read attempt, and sandbox module 108 may perform the read attempt on the sandbox version of the file 222.

At some later point in time, application 402 may attempt to close file 220. In this example, interception module 106 may intercept the close attempt, and sandbox module 108 may send an instruction to analysis module 110 to analyze the sandbox version of the file 222. Analysis module 110 may then analyze the sandbox version of the file 222 for potential data-loss violations. If analysis module 110 determines that writing the sandbox version of the file 222 to external device 120 would not violate any data-loss policy, analysis module 110 may copy the sandbox version of the file 222 to external device 120.

Figure 5:
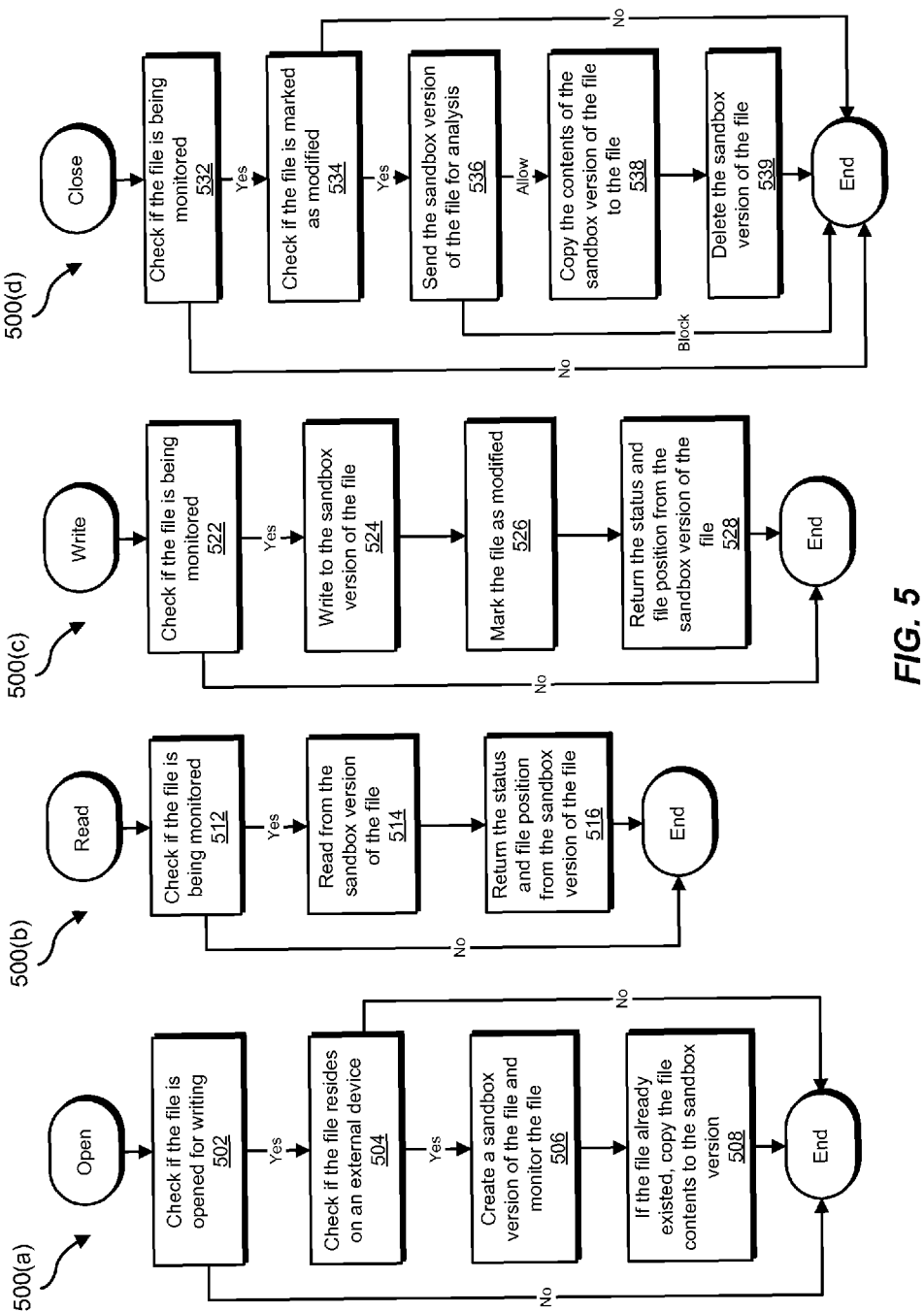
FIG. 5 is a set of flow diagrams of exemplary methods for preventing data loss on external devices.

FIG. 5 is a set of flow diagrams of exemplary computer-implemented methods 500(*a*)-(*d*) for preventing data loss on external devices. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, and/or system 400 in FIG. 4. For example, the steps shown in FIG. 5 may be performed by sandbox module 108 and/or analysis module 110 in FIG. 4.

In some embodiments, some of the steps shown in FIG. 5 may be performed in the context of driver callback routines. For example, as mentioned earlier, interception module 106 may include portions or all of a file system filter driver (such as a minifilter driver). In this example, the filter driver may register a pre-operation callback routine and/or a post-operation callback routine for each file system operation. For example, the steps of 500(*a*) may include both a callback routine that is executed before attempting to open a file and a callback routine that is executed after attempting to open the file. Likewise, the steps of 500(*b*) may include a callback routine that is executed before attempted read operations on a file, the steps of 500(*c*) may include a callback routine that is executed before attempted write operations on a file, and the steps of 500(*d*) may include a callback routine that is executed before attempting to close a file. Such callback routines may include parts of interception module 106, sandbox module 108, and/or analysis module 110 in FIG. 4, as detailed above.

For example, at the start of method 500(*a*) in FIG. 5, interception module 106 (as part of, for example, a file system filter driver) may intercept an attempt to open a file. At step 502, sandbox module 108 (as part of, for example, a pre-open callback routine) may check if the file is being opened for writing.

If the file is being opened for writing, sandbox module 108 may ensure that the file is opened for reading so that the file may be copied to a sandbox version of the file if necessary. Likewise, in some embodiments, sandbox module 108 may ensure that a file that is opened for delete access without write access is opened for write access.

Once sandbox module 108 has determined that the file is opened for writing, at step 504 sandbox module 108 may check if the file resides on an external device. According to some embodiments, the pre-open callback routine of the filter driver may then terminate, allowing the open attempt on the file to proceed.

Once sandbox module 108 has determined that the file resides on an external device, at step 506 sandbox module 108 may create a sandbox version of the file and monitor the file. Sandbox module 108 may perform this step in a variety of contexts. For example, sandbox module 108 may create the sandbox version of the file as part of a post-open callback routine. Additionally or alternatively, sandbox module 108 may create the sandbox version of the file as part of a separate client application that receives communications from a post-open callback routine. For example, a post-open callback routine may send data related to the creation of the file on the external device to a client application. The client application (as part of sandbox module 108) may then respond with one of several instructions, such as "FilterSandbox" (e.g., mark the file for sandbox operations and proceed to step 508), "FilterSandboxNoInitialCopy" (e.g., mark the file for sandbox operations and skip step 508), "FilterDeny" (e.g., refuse access to the file), and/or "FilterIgnore" (e.g., ignore the file for sandboxing purposes).

Returning to FIG. 5, at step 508 of method 500(*a*) sandbox module 108 may copy the file contents to the sandbox version of the file if the file already existed on the external device. Sandbox module 108 may perform this step in any suitable context. For example, sandbox module 108 may perform this step as part of a post-open callback routine. According to some embodiments, sandbox module 108 may only perform copy the file contents to the sandbox version if the file is not already sandboxed (e.g., the file has not already been opened).

At the start of method 500(*b*), interception module 106 (as part of, for example, a file system filter driver) may intercept an attempt to read from the file. At step 512 sandbox module 108 (as part of, for example, a pre-read callback routine) may check if the file is being monitored (e.g., sandbox module 108 may check if there is a sandbox version of the file). If the file is being monitored, at step 514 sandbox module 108 may read from the sandbox version of the file. Sandbox module 108 may then, at step 516, return the status of the read attempt as well as the current file position from the sandbox version of the file.

According to some embodiments, sandbox module 108 may disallow the read attempt altogether if the read attempt is a part of a cached I/O operation (e.g., a FASTIO operation) or any other type of I/O operation that may break assumptions made by sandbox module 108.

At the start of method 500(*c*), interception module 106 (as part of, for example, a file system filter driver) may intercept an attempt to write to the file. At step 522 sandbox module 108 (as part of, for example, a pre-write callback routine) may check if the file is being monitored (e.g., sandbox module 108 may check if there is a sandbox version of the file). If the file is being monitored, at step 524 sandbox module 108 may write to the sandbox version of the file (e.g., the write attempt originally directed to the file may be redirected to the sandbox version of the file). At step 526, sandbox module 108 may mark the file as modified. As mentioned earlier and as will be discussed below in reference to step 534, analysis module 110 may only analyze the sandbox version of the file if the sandbox version of the file has been modified. At step 528, sandbox module 108 may return the status and file position from the sandbox version of the file.

According to some embodiments, sandbox module 108 may disallow the write attempt altogether if the write attempt is a part of a cached I/O operation (e.g., a FASTIO operation) or any other type of I/O operation that may break assumptions made by sandbox module 108.

At the start of method 500(*d*), interception module 106 (as part of, for example, a file system filter driver) may intercept an attempt to close the file. At step 532, sandbox module 108 (as part of, for example, a pre-close callback routine) may check if the file is being monitored (e.g., sandbox module 108 may check if there is a sandbox version of the file). If the file is being monitored, at step 534 sandbox module 108 may check if the file is marked as modified (e.g., as part of step 526 of method 500(*c*)). If the file is marked as modified, at step 536 sandbox module 108 may send the sandbox version of the file for analysis.

As part of step 536, analysis module 110 may analyze the sandbox version of the file. Analysis module 110 may then block the sandbox version of the file from the external device or allow the sandbox version of the file. Analysis module 110 may perform this step in a variety of contexts. For example, analysis module 110 may analyze the sandbox version of the file as part of a pre-close callback routine. Additionally or alternatively, analysis module 110 may analyze the sandbox version of the file as part of a separate client application that receives communications from a pre-close callback routine. For example, a pre-close callback routine may send a "FilterFileClose" message to the client application and wait for a response. The client application (as part of analysis module 110) may then respond with one of several instructions, such as "FilterAllow" (allowing the sandbox version of the file) and/or "FilterDelete" (blocking the sandbox version of the file).

If analysis module 110 allows the sandbox version of the file, at step 538 analysis module 110 may copy the contents of the sandbox version of the file to the file. Sandbox module 108 may then, at step 539, delete the sandbox version of the file.

According to some embodiments, sandbox module 108 may disallow the close attempt altogether if the close attempt is a part of a cached I/O operation (e.g., a FASTIO operation) or any other type of I/O operation that may break assumptions made by sandbox module 108. After step 539, the sandboxing process of the file on the external device may terminate.

According to some embodiments, sandbox module 108 may include callback routines for other file-system operations. For example, interception module 106 may intercept attempts to change metadata related to the file. Sandbox module 108 may also include a pre-operation callback routine to manage such attempts. In one example, sandbox module 108 may apply basic file operations, file renaming operations, and file disposition operations to both the file on the external device and the sandbox version of the file. For other operations related to the file, sandbox module 108 may direct the operation to the sandbox version of the file only.

In another example, sandbox module 108 may include a callback routine for querying information from a file, and redirect queries from the file on the external device to the sandbox version of the file. In an additional example, sandbox module 108 may include a callback routine for flushing buffers, and redirect attempts to flush a buffer corresponding to the file on the external device toward the sandbox version of the file.

In some embodiments, sandbox module 108 may only monitor and/or mark for sandboxing a file on an external device if the file is not a volume. According to some embodiments, sandbox module 108 may only monitor and/or mark for sandboxing a file on an external device if the file is opened with delete access and the opening application is one of a certain set of applications (such as MICROSOFT WORD, MICROSOFT EXCEL, and/or MICROSOFT POWERPOINT).

As will be explained below, by intercepting attempts to write to a file on an external device and redirecting those attempts to a sandbox version of the file, the systems and methods described herein may ensure that writes to the file comply with data loss protection policies before actually writing data to the external device (which may, as detailed above, potentially lead to irreversibly leaking sensitive data).

Figure 6:
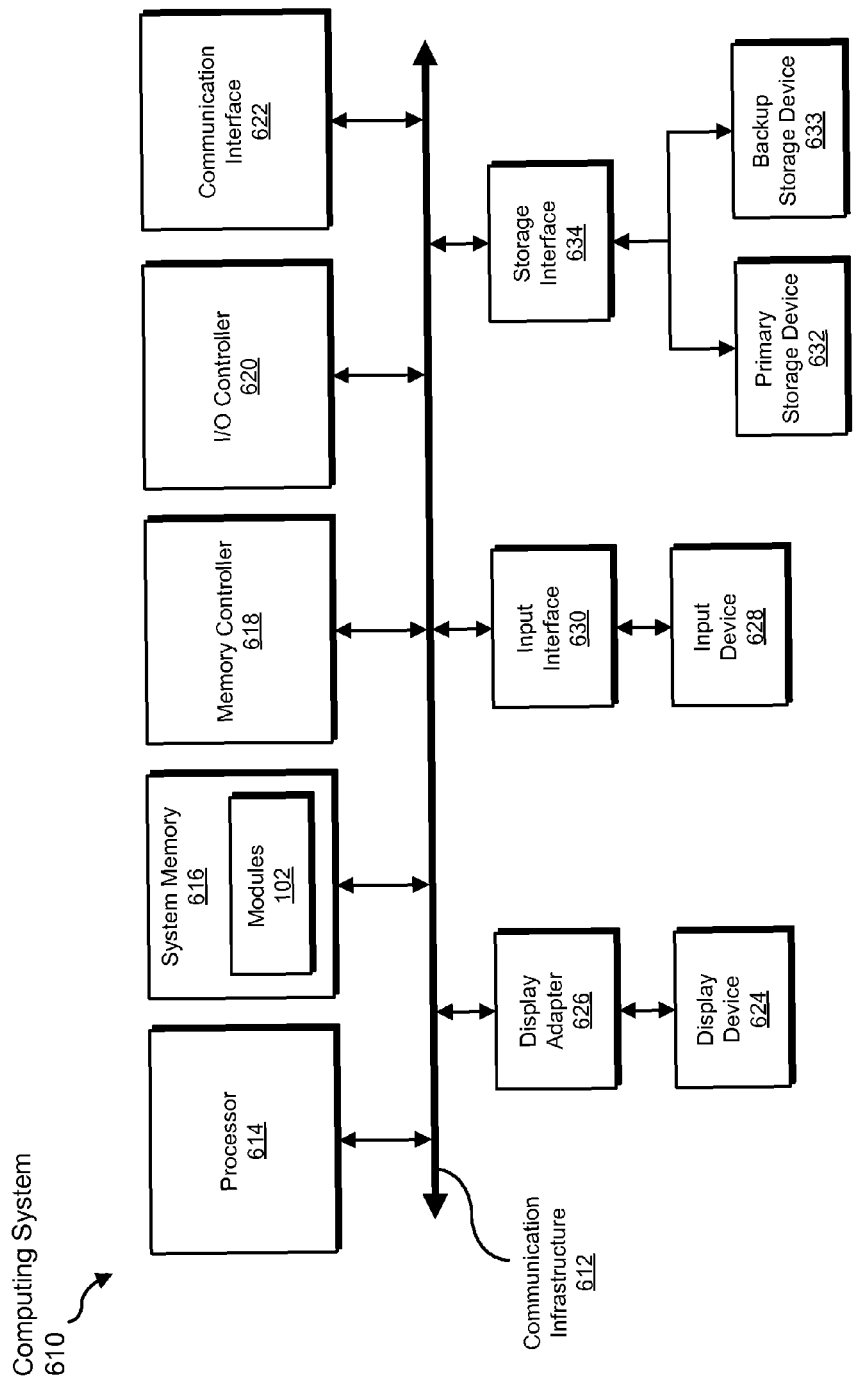
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, intercepting, creating, performing, analyzing, determining, copying, detecting, and/or deleting steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller may perform and/or be a means for performing, either alone or in combination with other elements, one or more of the steps or features described and/or illustrated herein, such as identifying, intercepting, creating, performing, analyzing, determining, copying, detecting, and/or deleting.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, intercepting, creating, performing, analyzing, determining, copying, detecting, and/or deleting steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, intercepting, creating, performing, analyzing, determining, copying, detecting, and/or deleting steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, intercepting, creating, performing, analyzing, determining, copying, detecting, and/or deleting steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, intercepting, creating, performing, analyzing, determining, copying, detecting, and/or deleting steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
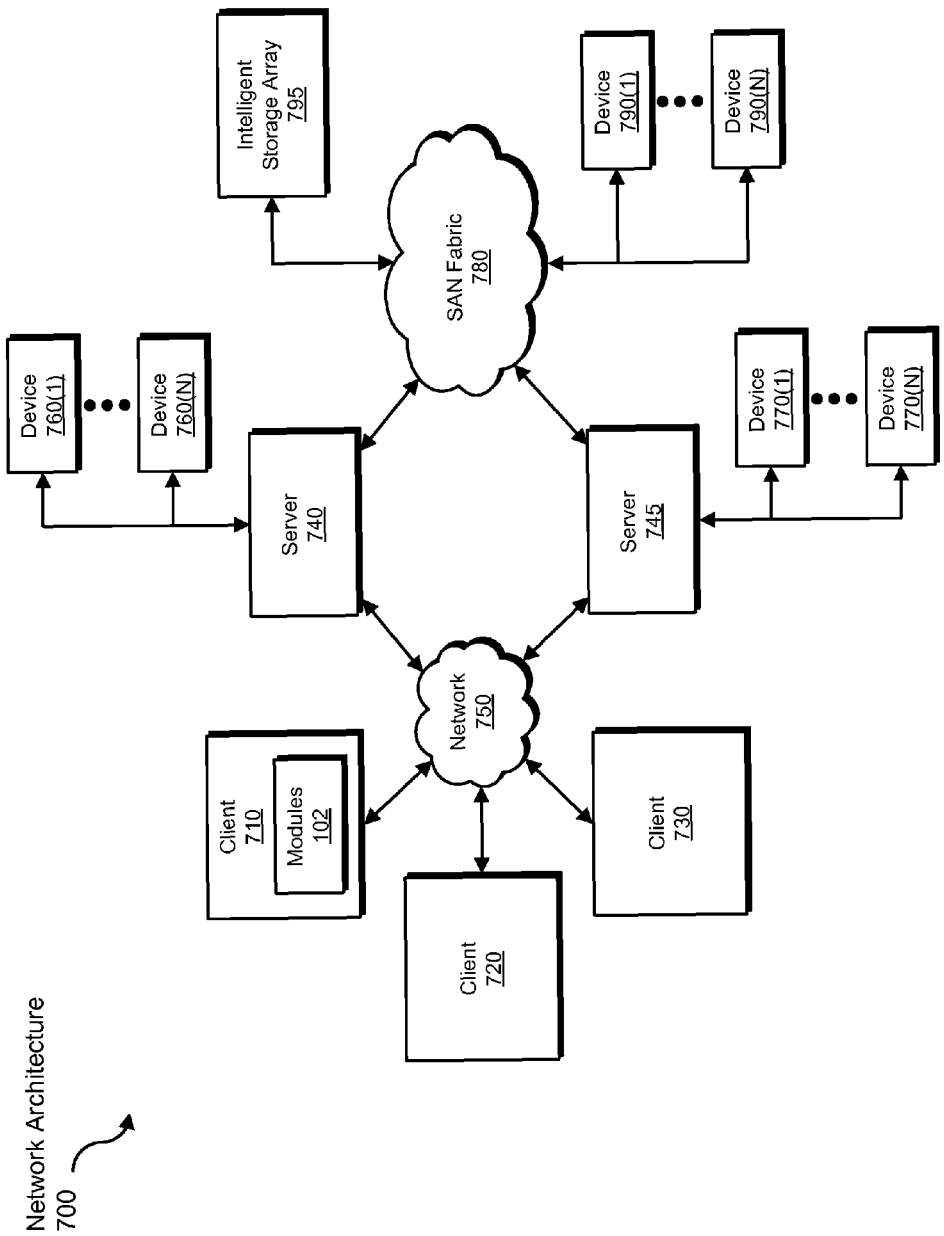
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include modules 102 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, intercepting, creating, performing, analyzing, determining, copying, detecting, and/or deleting steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for preventing data loss on external devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In some embodiments, one or more of the systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the modules described herein may transform data, physical devices, and/or representations of physical devices from one form to another. For example, one or more of the modules described herein may transform a computing device into a data-loss protection system capable of preventing data loss on external devices.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing data loss on external devices, at least a portion of the method being performed by a computing device comprising at least one processor, the method comprising:
   identifying an external device;
   intercepting a write attempt to a file on the external device;
   creating a sandbox version of the file;
   redirecting the intercepted write attempt from the file to the sandbox version of the file;
   analyzing the sandbox version of the file for potential data-loss violations and then either:
   determining, based on the analysis of the sandbox version of the file that a data-loss violation has not occurred and then copying the sandbox version of the file to the file on the external device or
   detecting, based on the analysis of the sandbox version of the file, a data-loss violation and then deleting the sandbox version of the file.

2. The computer-implemented method of claim 1, wherein creating the sandbox version of the file comprises creating the sandbox version of the file on a local device.

3. The computer-implemented method of claim 1, wherein creating the sandbox version of the file comprises:
   intercepting an attempt to open the file;
   determining that the file is not open;
   copying the contents of the file to the sandbox version of the file.

4. The computer-implemented method of claim 1, wherein creating the sandbox version of the file comprises at least one of:
   creating the sandbox version of the file on a hidden virtual disk;
   creating the sandbox version of the file with restricted access privileges.

5. The computer-implemented method of claim 1, wherein analyzing the sandbox version of the file for potential data-loss violations comprises:
   intercepting an attempt to close the file;
   analyzing the sandbox version of the file for potential data-loss violations before closing the file.

6. The computer-implemented method of claim 1, further comprising redirecting an attempt to read from the file to the sandbox version of the file.

7. The computer-implemented method of claim 1, further comprising marking the sandbox version of the file as modified.

8. The computer-implemented method of claim 1, wherein analyzing the sandbox version of the file for potential data-loss violations comprises determining that the sandbox version of the file was modified.

9. The computer-implemented method of claim 1, wherein identifying the external device comprises identifying at least one of:
- a network share;
- a USB storage device;
- a compact disc drive;
- a DVD drive.

10. A system for preventing data loss on external devices, the system comprising:
- an identification module programmed to identify an external device;
- an interception module programmed to intercept a write attempt to a file on the external device;
- a sandbox module programmed to:
  - create a sandbox version of the file;
  - redirect the intercepted write attempt from the file to the sandbox version of the file;
- an analysis module programmed to analyze the sandbox version of the file for potential data-loss violations and then either:
- determine, based on the analysis of the sandbox version of the file that a data-less violation has not occurred and then copying the sandbox version of the file to the file on the external device or
- detect, based on the analysis of the sandbox version of the file, a data-loss violation and then deleting the sandbox version of the file;
- at least one processor configured to execute the identification module, the interception module, the sandbox module, and the analysis module.

11. The system of claim 10, wherein the sandbox module is programmed to create the sandbox version of the file by creating the sandbox version of the file on a local device.

12. The system of claim 10, wherein the sandbox module is programmed to create the sandbox version of the file by:
- intercepting an attempt to open the file;
- determining that the file is not open;
- copying the contents of the file to the sandbox version of the file.

13. The system of claim 10, wherein the sandbox module is programmed to create the sandbox version of the file by at least one of:
- creating the sandbox version of the file on a hidden virtual disk;
- creating the sandbox version of the file with restricted access privileges.

14. The system of claim 10, wherein the analysis module is programmed to analyze the sandbox version of the file for potential data-loss violations by:
- intercepting an attempt to close the file;
- analyzing the sandbox version of the file for potential data-loss violations before closing the file.

15. The system of claim 10, wherein the interception module is further programmed to redirect an attempt to read from the file to the sandbox version of the file.

16. A computer-readable-storage medium comprising one or more computer-executable instructions that, when executed by at least one processor of a computing device, cause the computing device to:
- identify an external device;
- intercept a write attempt to a file on the external device;
- create a sandbox version of the file;
- redirect the intercepted write attempt from the file to the sandbox version of the file;
- analyze the sandbox version of the file for potential data-loss violations and then either:
- determine, based on the analysis of the sandbox version of the file that a data-less violation has not occurred and then copying the sandbox version of the file to the file on the external device or
- detect, based on the analysis of the sandbox version of the file. a data-loss violation and then deleting the sandbox version of the file.

\* \* \* \* \*